United States Patent [19]
Hyodo et al.

[11] Patent Number: 6,066,938
[45] Date of Patent: May 23, 2000

[54] CHARGING SYSTEM INCLUDING A CHARGER AND AN ELECTRIC POWER TOOL OPERATING ON AN INTERNAL BATTERY UNIT

[75] Inventors: Koki Hyodo, Nishio; Manabu Sugimoto, Nukata-gun; Shin-ichi Nakane; Shingo Umemura, both of Okazaki; Kazuyoshi Horikawa, Tenryu, all of Japan

[73] Assignees: Makita Corporation, Anjo; Honda Giken Kogyo Kabushiki Kaisha, Tokyo, both of Japan

[21] Appl. No.: 09/272,635

[22] Filed: Mar. 18, 1999

[30] Foreign Application Priority Data

Mar. 18, 1998 [JP] Japan .................................. 10-068619

[51] Int. Cl.[7] .................................................. H02J 7/00
[52] U.S. Cl. ........................................... 320/114; 320/115
[58] Field of Search ..................................... 320/114, 115; D8/68; 30/500, DIG. 1; 211/69; 408/116, 239 R; 173/217

[56] References Cited

U.S. PATENT DOCUMENTS

| | | | |
|---|---|---|---|
| 4,225,814 | 9/1980 | Gantz et al. | 320/115 |
| 5,213,913 | 5/1993 | Anthony, III et al. | 429/97 |
| 5,354,215 | 10/1994 | Viracola | 439/500 |
| 5,525,889 | 6/1996 | Chan et al. | 173/217 |
| 5,769,657 | 6/1998 | Kondo et al. | 439/500 |

FOREIGN PATENT DOCUMENTS

| | | |
|---|---|---|
| 4-281332 | 10/1992 | Japan . |
| 4-351427 | 12/1992 | Japan . |
| 4-351428 | 12/1992 | Japan . |

*Primary Examiner*—Adolf Deneke Berhane
*Assistant Examiner*—Gregory J Toatley, Jr.
*Attorney, Agent, or Firm*—Lahive & Cockfield, LLP

[57] ABSTRACT

A battery-charging system is provided that does not require removal of batteries from an impact screwdriver (1) for recharging. The battery-charging system includes the impact screwdriver and a charger (20). The impact screwdriver (1) has a nose (3a) to which a tool bit is attached. The impact screwdriver additionally includes a grip handle (4) containing a battery unit (5) whose terminals (10) for recharging are exposed in a surface of a protrusion (7) of the grip handle. The charger (20) includes a charger circuit encased in an enclosure having a base (21) covered with a housing (22). The housing of the charger is provided with a first receiving recess (29) which can receive the nose (3a) of the screwdriver and a second receiving recess (30) which can receive the protrusion (7) of the screwdriver. The system additionally includes a pair of charge terminals of the charger circuit that resiliently projects into the second receiving recess (30). The charger circuit terminals are brought into electrical contact with the corresponding terminals in the protrusion of the impact screwdriver when the screwdriver is set on the charger. While the battery unit is charged, the entire impact screwdriver (1), not the battery unit alone, is set on the charger (20) with the nose placed in the first receiving recess and the protrusion in the second receiving recess.

17 Claims, 8 Drawing Sheets

CHARGING SYSTEM INCLUDING A CHARGER AND AN ELECTRIC POWER TOOL OPERATING ON AN INTERNAL BATTERY UNIT

This application claims priority on Japanese Patent Application No. 10-68619, the contents of which are incorporated herein by reference.

BACKGROUND OF THE INVENTION

1. Field of the Invention

The present invention relates to battery-charging systems for electrical equipment. More particularly, the present invention relates to a battery-charging system that includes an electric power tool using rechargeable batteries as a power source and a battery charger for charging the batteries of the electric power tool.

2. Description of the Related Art

One type of conventional rechargeable electric power tools incorporates a detachable battery pack mounted in the lower end of the handle thereof. When the battery pack needs to be recharged, it is detached from the handle of the tool and set on a separate charger. After the charging is completed, the battery pack is remounted in the handle to resume operation. If an electric power tool operating on a detachable battery pack is used for extended periods, such as on a production or assembly line of an automobile plant, an auxiliary battery pack is set in a charger for recharging. When the pack mounted in the tool is discharged, the operator replaces it with the one recharged by the charger and sets the discharged battery pack on the charger for recharging.

Battery packs used for the above-described purpose are generally designed to maximize the operating time of the tool. This tends to increase the size and weight of the packs, which in turn places an excessive physical strain on the operators and reduces the operability of the tools and the work efficiency. This tendency is particularly pronounced when such large and heavy battery packs are used on assembly lines for an extended period; the operability of the tools may be severely affected so as to significantly reduce the productivity of the plant. In addition, loss of time by replacing discharged battery packs has been a significant factor reducing work efficiency.

SUMMARY OF THE INVENTION

In view of the above-identified problems, an important object of the present invention is to provide a battery-charging system that does not require replacement of flat or discharged batteries in electric power tools, thus improving work efficiency and the operability of the tools.

Another object of the present invention is to provide a battery-charging system capable of recharging the batteries in electric power tools with little trouble and labor.

The above objects and other related objects are realized by the invention, which provides a power tool charging system that has an electric power tool, such as an impact screwdriver, and a charger on which the electric power tool is set for charging. The electric power tool includes at least one rechargeable battery, a handle containing the at least one battery, a plurality of first terminals provided on the handle for passing currents for charging the at least one battery, a nose to which a tool bit is attached, and a motor powered by the at least one battery for driving the nose. The charger includes first means for receiving the handle of the electric power tool, second means for receiving the nose of the electric power tool, and a first recess disposed between the first and second receiving means. The first recess is configured to provide clearance around the handle when the electric power tool is set on the charger. The charger additionally includes a plurality of second terminals that are connected to a charger circuit and are provided in the first receiving means, the second terminals establishing electrical contact with the first terminals when the electric power tool is set on the charger. Thus constructed, the charger is capable of charging at least one battery of the electric power tool when the handle and the nose are placed in the first and second receiving means, respectively.

According to one aspect of the present invention, first elastic means and second elastic means are provided in the first receiving means and the second receiving means, respectively, such that the elastic means are elastically deformed approximately in the direction in which the electric power tool is set on the charger.

According to another aspect of the present invention, the first and second elastic means are made of rubber adapted to cushion the impact of the handle and the nose on the first and second receiving means, respectively, when the handle and the nose are placed in the first and second receiving means.

According to still another aspect of the present invention, the clearance around the handle is at least large enough to allow an operator's hand to grip the handle without coming into contact with the charger.

According to yet another aspect of the present invention, the second terminals are individually detachably mounted on a surface of the first receiving means and project from the surface so as to individually and elastically deform approximately in the direction in which the electric power tool is set on the charger, and the first terminals are pressed into contact with the second terminals while the electric power tool is set on the charger. This structure ensures secure electrical contact between the charger and the tool.

In accordance with another aspect of the present invention, the second receiving means defines a second recess rimmed with at least one slope for guiding the nose into the second recess. The second recess additionally includes a bottom surface covered with the first elastic means to dampen the impact of the tool on the charger.

In one practice, the first terminals are provided on a protrusion that extends from the handle approximately parallel to the nose and further wherein the first receiving means defines a third recess rimmed with at least one slope for guiding the protrusion on the handle into the third recess, the third recess having a bottom surface on which the second elastic means is provided and from which the second terminals project.

In another practice, the third recess has a shape complementary to the protrusion so that the protrusion fits in the third recess.

In still another practice, the system of the present invention further includes a fan in the charger for activation while the at least one battery is charged by the charger and for drawing air from the outside of the charger and discharging the drawn air at the second terminals in the second receiving means.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENT

A preferred embodiment according to the present invention will be described hereinafter with reference to the attached drawings.

Figure 1:
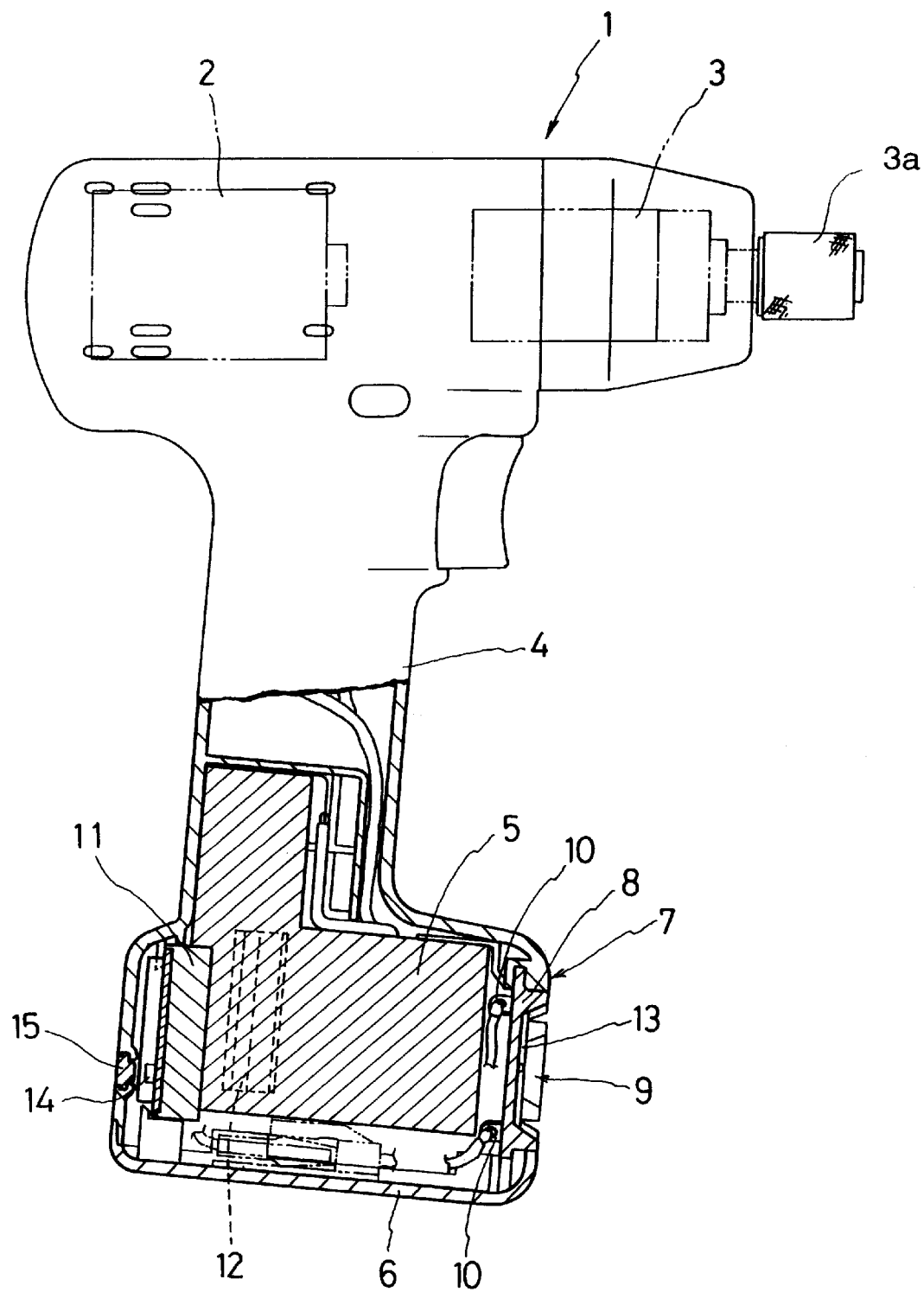
FIG. 1 is a partially cutaway side elevation of a rechargeable impact screwdriver operating on a rechargeable battery unit for used in a battery-charging system according to the present invention.

FIG. 1 is a partially cutaway side elevation of a rechargeable impact screwdriver 1 that operates on a rechargeable battery unit 5 for used in a battery-charging system according to the present invention. The impact screwdriver 1 includes a motor 2 interlocked with an hydraulic unit 3 by means of a reducer (not shown). The hydraulic unit 3 is coupled to a nose or chuck (driven unit) 3a to which a tool bit (not shown) is attached. During operation, the torque produced by the motor 2 is transmitted to the tool bit by way of the reducer, the hydraulic unit 3, and the nose 3a. The hydraulic unit 3 allows the transmitted torque to vary in response to the load applied to the tool bit so as to tighten screws and bolts.

Figure 2:
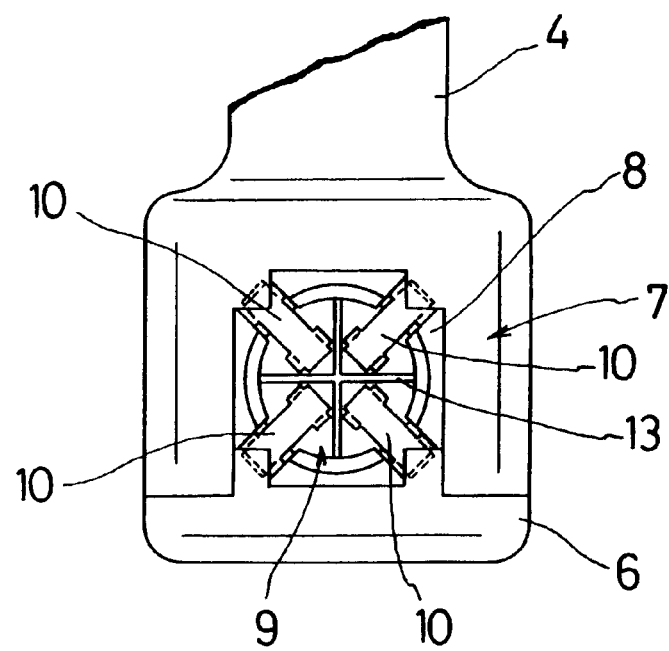
FIG. 2 is a front view of a protrusion formed in a grip handle of the impact screwdriver shown in FIG. 1.
Figure 3:
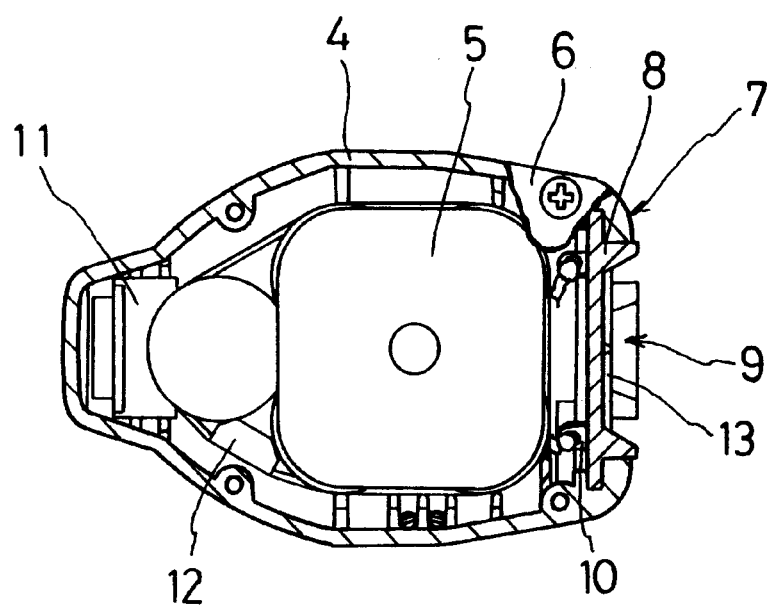
FIG. 3 is a bottom view of the inside of the grip handle of the impact screwdriver shown in FIG. 1 with a bottom cover removed.

Still referring to FIG. 1, the impact screwdriver 1 has a grip handle 4 that contains the internal battery unit 5 in the lower portion thereof. The battery unit 5 includes a plurality of batteries as a power source for the drive circuit of the motor 2. A reference numeral 6 indicates a cover screwed to the bottom surface of the grip handle 4. In addition, the bottom portion of the grip handle 4 includes a protrusion 7 which is located on the same side of the handle 4 as the nose 3a and which extends approximately parallel to the nose 3a of the impact screwdriver 1. A terminal block 8 is mounted in the inner edges of the protrusion 7. As shown in FIG. 2, the terminal block 8 defines a circular recess 9 whose peripheral wall tapers to the bottom thereof. Four terminals 10 are disposed radially from the center of the bottom of the recess 9, dividing the tapered peripheral wall into four equal sections. Two of the terminals 10 are positive and negative electrodes connectable to the battery unit 5 for recharging. Another terminal 10 is connected to a controller 11 (see FIG. 3) disposed in the grip handle 4 opposite the recess 9 in order to transmit data on the charge level of the battery unit 5. The other terminal is connected to a temperature sensor (thermistor) 12 for detecting the temperature of the battery unit 5. As shown in FIG. 3, the temperature sensor 12 is placed in contact with the side surface of the battery unit 5 in the grip handle 4. Moreover, a cross ridge 13 is formed on the bottom of the recess 9 in order to prevent short-circuits of terminals 10 by separating the terminals.

Referring to FIG. 1 again, the controller 11 includes a central processing unit (CPU), an integrating circuit, and a storage circuit for calculating and storing the charge level of the battery unit 5. The controller 11 is provided with a charge level indicator function. When the battery charge is at or above a predetermined threshold (30% of full charge in this embodiment), the controller 11 causes a light-emitting diode (LED) 14 provided thereon to light up, indicating to the operator the charge level of the batteries through a lens 15 mounted in the grip handle 4. When the charge drops below the threshold, the controller 11 turns off the LED 14, indicating to the operator that the battery unit 5 requires recharging.

Figure 4:
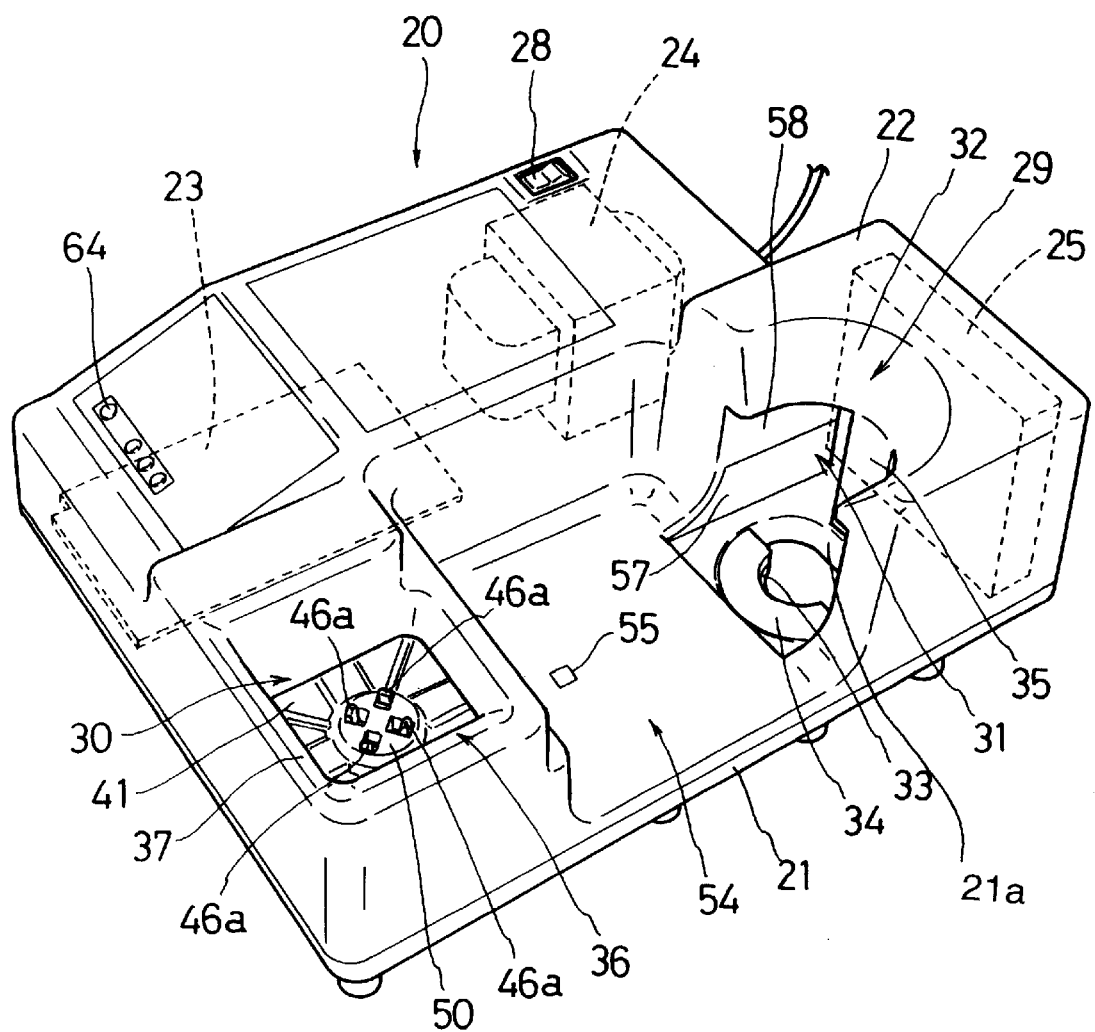
FIG. 4 is a perspective view of a charger for use with the battery unit of the impact screwdriver shown in FIG. 1.
Figure 10:
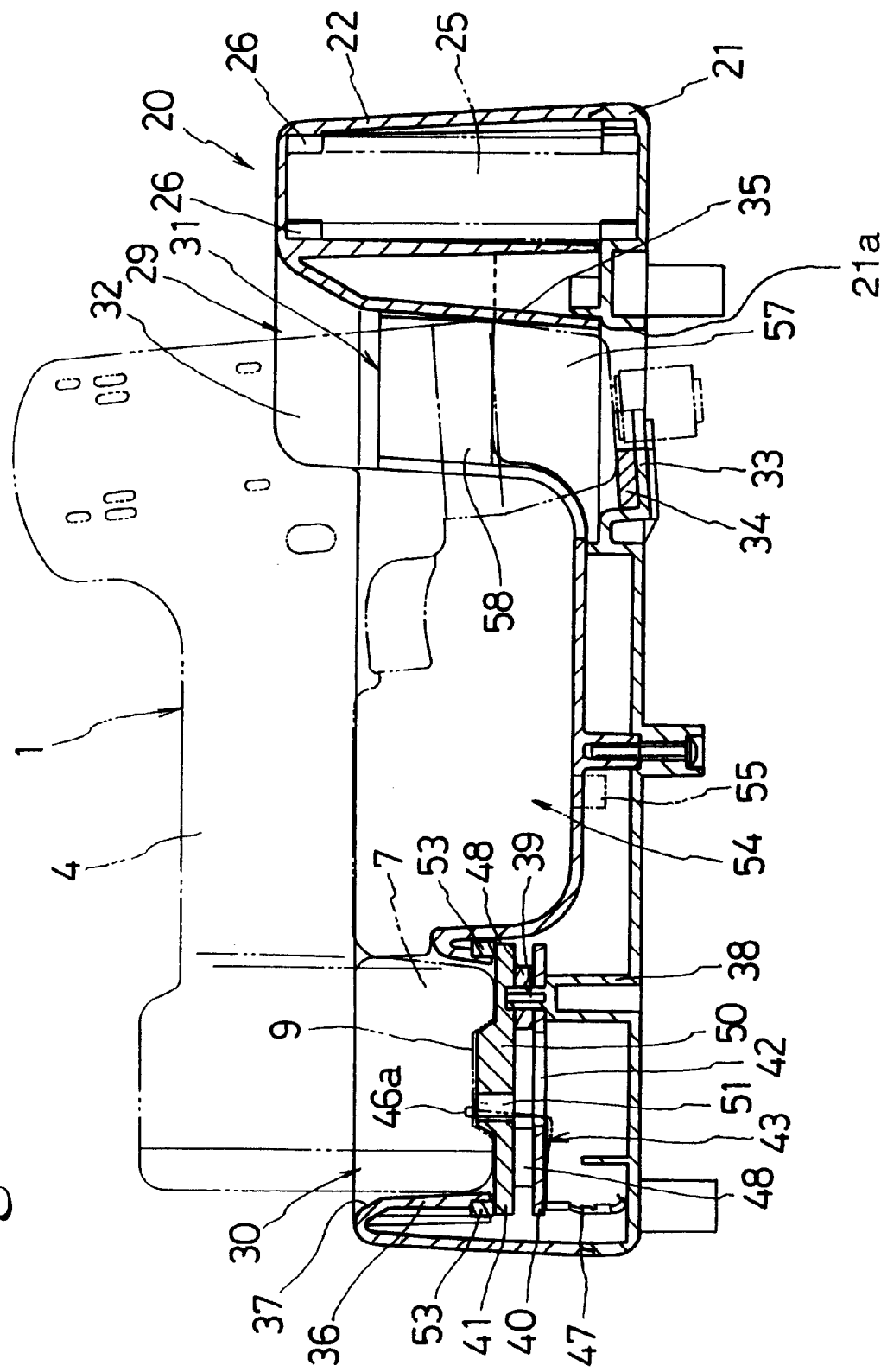
FIG. 10 is a lengthwise cross section of the charger of FIG. 4 with the impact screwdriver (shown in two-dot chain lines) set thereon for recharging.

FIG. 4 is a perspective view of a charger 20 for the battery unit 5 of the impact screwdriver 1. The charger 20, which operates on utility power, is an enclosure that includes a base 21 and a housing 22 which covers and is screwed to the base 21. The base 21 includes a controller substrate 23 realizing a charger circuit, a transformer 24, and a cooling fan 25 mounted thereon. During assembly, when the housing 22 is fitted over the base 21, ribs 26 and bosses 27 (see FIGS. 5, 6, 9, and 10) projecting from the underside of the housing 22 abut and fix the upper surfaces of the controller substrate 23, the transformer 24, and the cooling fan 25. Additionally, as best shown in FIGS. 4 and 10, the charger 20 includes a first receiving recess 29 for receiving the nose of the screwdriver 1 and a second receiving recess 30 for receiving the protrusion 7 of the grip handle 4 of the screwdriver 1.

Figure 5:
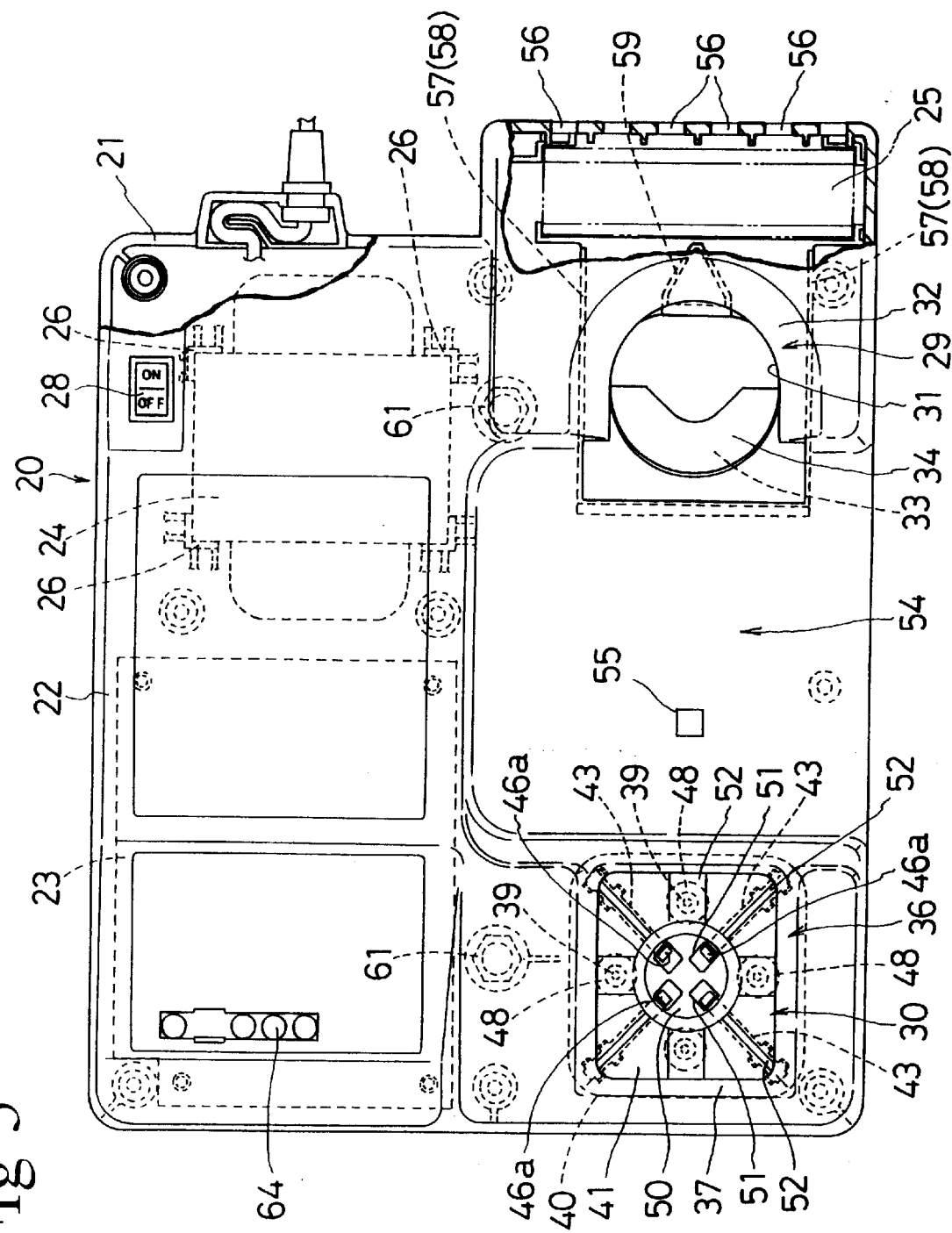
FIG. 5 is a partially cutaway plan view of the charger shown in FIG. 4.
Figure 6:
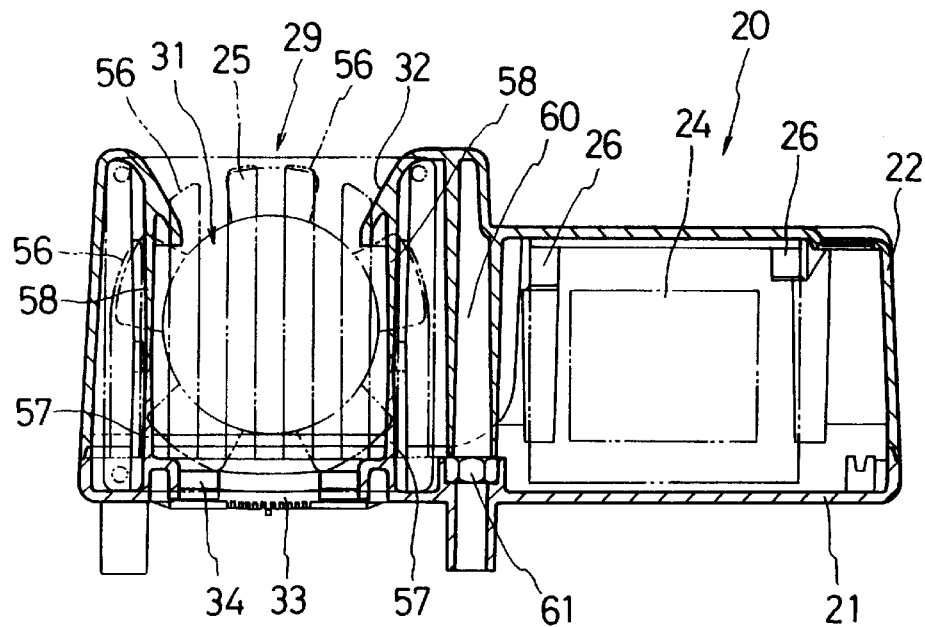
FIG. 6 is a widthwise cross section of a first receiving recess of the charger shown in FIG. 4.

As shown in FIGS. 4 to 6, the first receiving recess 29, which is formed in the housing 22, includes an opening 31 rimmed with a generally U-shaped guide slope 32 that narrows the opening as it tapers downward. The first receiving recess 29 additionally includes a semicircular resting plate 33 which has a semicircular recess facing the cooling fan 25. The base 21 includes an opening 21a formed therein adjacent the resting plate 33. The semicircular resting plate 33 and the opening 21a allow the operator to set the screwdriver 1 in the charger 20 without removing the tool bit attached to the driver. The resting plate 33 is covered with an identically shaped rubber cushion 34 on which the nose 3a of the impact screwdriver 1 is supported. A guard strip 35 extends vertically downward from the center of the lower edge of the guide slope 32, reaching the opening 21a to protect the cooling fan 25 from tool bits when they are inserted.

Figure 7:
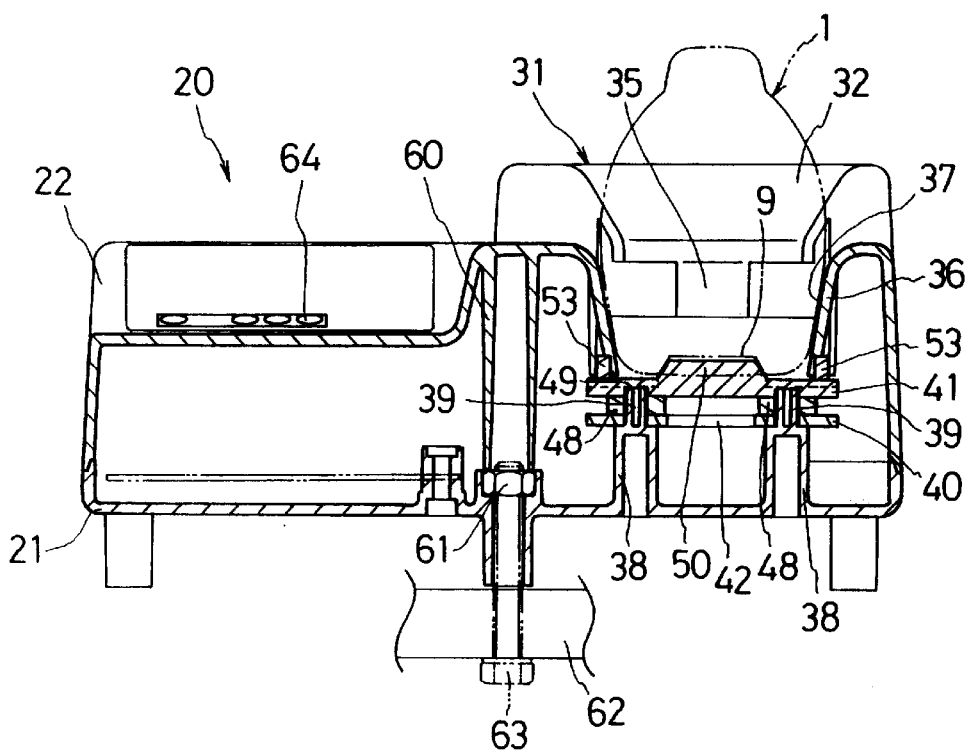
FIG. 7 is a widthwise cross section of a second receiving recess of the charger shown in FIG. 4.
Figure 8:
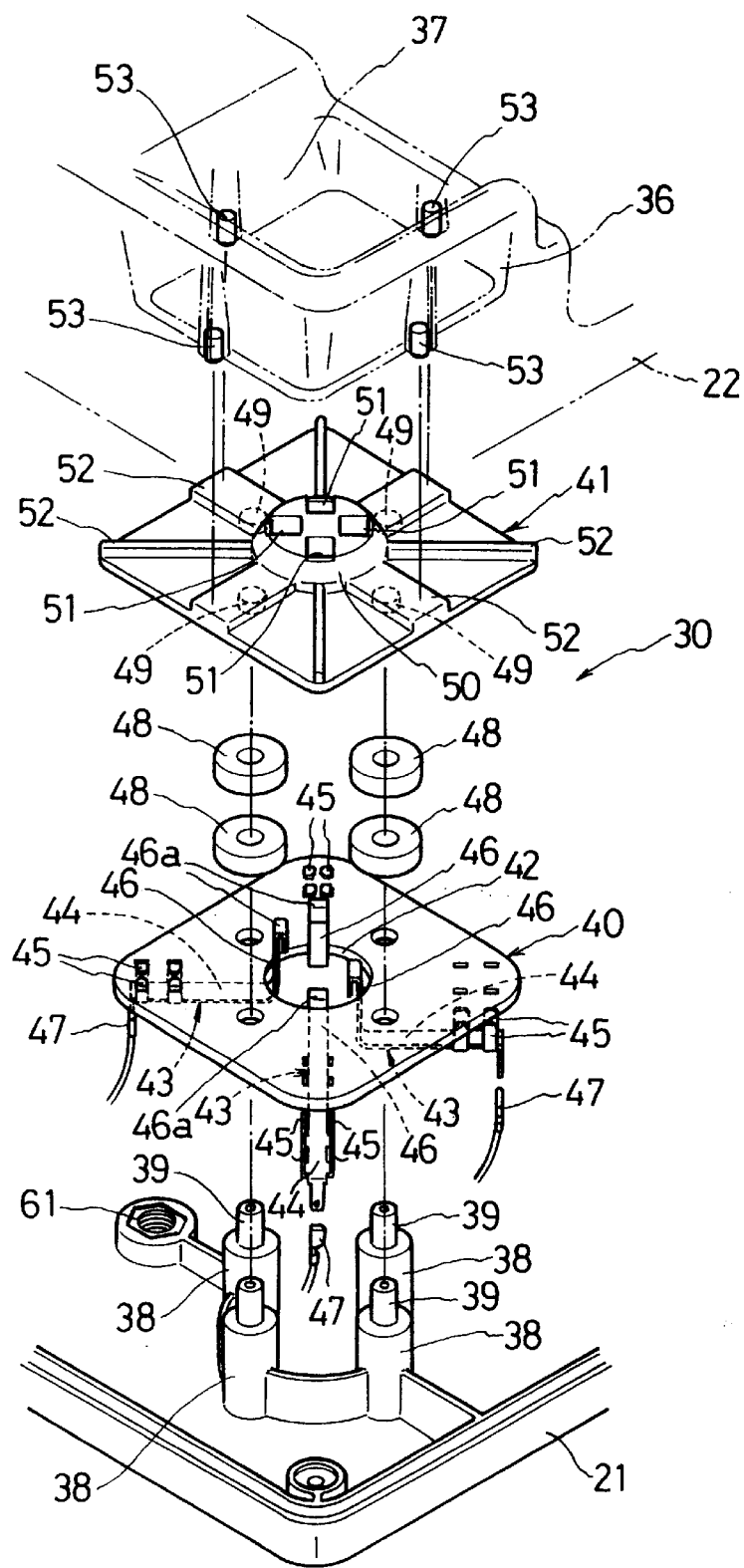
FIG. 8 is an exploded view of the second receiving recess of the charger shown in FIG. 4.
Figure 9:
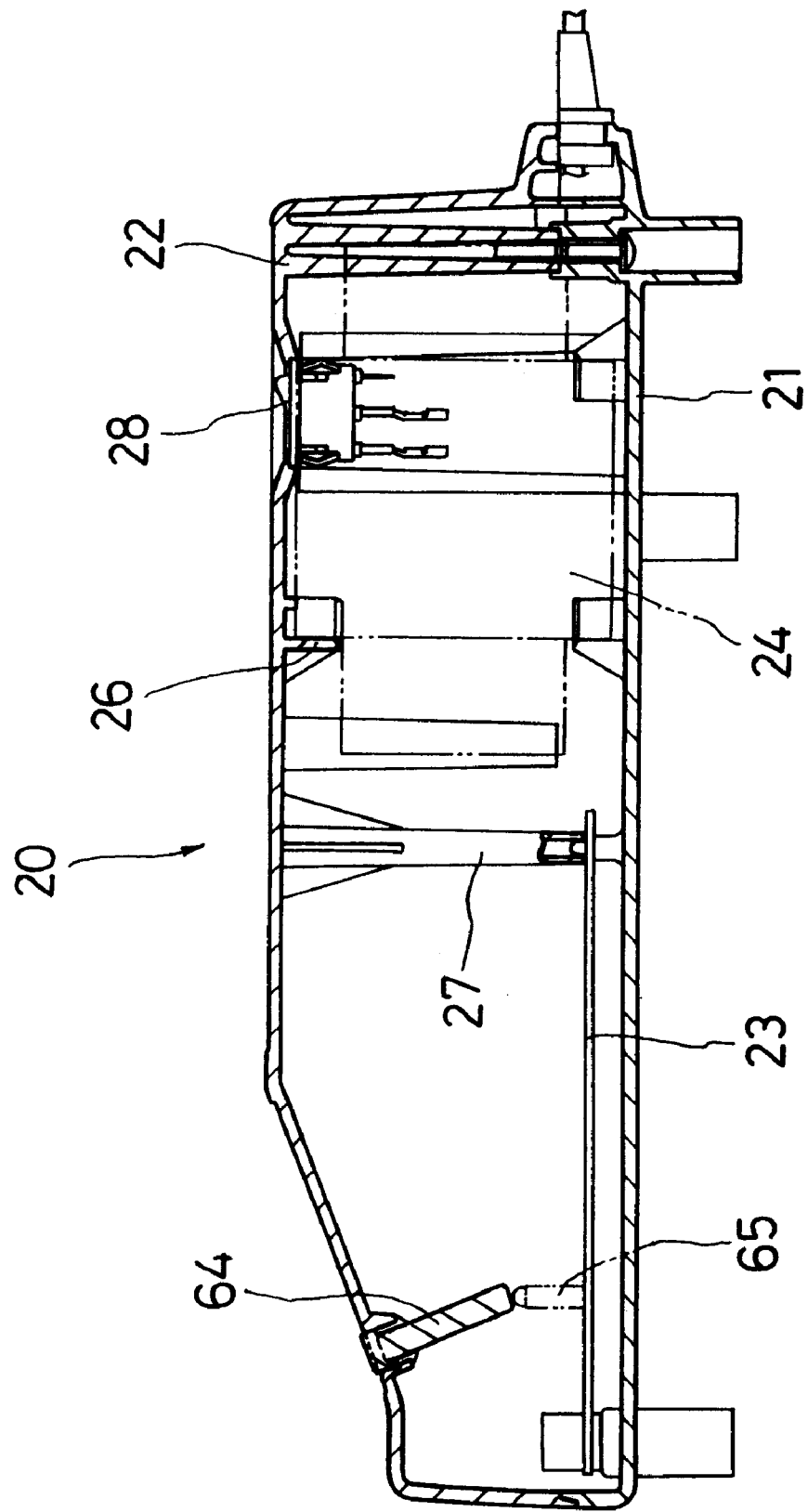
FIG. 9 is a lengthwise cross section of the charger of FIG. 4, showing a transformer and a control substrate (electrical components omitted from the view)

As shown in FIGS. 4, 5, and 7, the second receiving recess 30 is defined in the housing 22 and includes a square well 36 rimmed with guide slopes 37 that taper downward. As shown in FIG. 10, the protrusion 7 of the impact screwdriver 1 can be fitted in the second receiving recess 30 for recharging the batteries. As shown in FIGS. 5 and 8, four bosses 38 each having smaller and larger diameter sections are arranged on a circle on the base 21 immediately below the well 36. The bosses 38 support a terminal board 40 and a guide plate 41 placed thereon. The terminal board 40 is a square plate penetrated by the smaller sections of the bosses 38 and set on the larger diameter sections and includes a through-hole 42 in the center thereof. Four generally L-shaped terminals 43, each having a horizontal portion 44 and a vertical portion 46, are mounted on the underside of the terminal board 40. The horizontal portions 44 are caulked with nails 45 at the four corners of the terminal board 40 with the vertical portions 46 projecting upward above the terminal board 40 through the through-hole 42. As with the terminals 10 of the impact screwdriver 1, two of the terminals 43 are positive and negative electrodes for charging the battery unit 5. Another terminal 43 is connectable to the temperature sensor 12 for detecting the temperature of the battery unit 5. The other terminal 43 is provided to relay data on the charge level of the battery unit 5 to the controller substrate 23. The outer end of each terminal 43 is connected to a lead wire from the controller substrate 23 by means of a receptacle 47 fitted on the outer end.

A rubber ring 48 is fitted around the small diameter portion 39 of each boss 38 and on the upper surface of the terminal board 40. The guide plate 41 includes four positioning holes 49 formed in the underside thereof into which the small diameter portions 39 are fitted so that the guide plate 41 is mounted on the upper surface of the rubber rings 48. The guide plate 41 additionally includes in the center a tapered circular protrusion 50 configured so as to fit in the circular recess 9 formed in the protrusion 7 of the impact screwdriver 1. The circular protrusion 50 in turn includes four through-holes 51 formed radially therein which are penetrated by the vertical portions 46 of the terminals 43. When the guide plate 41 is set in place, a folded contact 46a at the upper end of each terminal 43 slightly protrudes above the upper surface of the circular protrusion 50. As the impact screwdriver 1 is set on the charger 20 for a recharge, the contacts 46a come into contact with the corresponding terminals 10 of the screwdriver 1. Furthermore, two cross ridges 52 are formed on the guide plate 41 radially from the circular protrusion 50 to provide two different levels on the guide plate 41, except where the circular protrusion 50 is located.

When the housing 22 is assembled with the terminal board 40 and the guide plate 41 set in place, the guide plate 41 is exposed in the second receiving recess 30 below the lower opening of the well 36, locating the circular protrusion 50 in the center. Four rubber pins 53 protrude downward from the lower edge of the well 36 so that only the rubber pins 53 abut the upper surface of the guide plate 41 when the housing 22 is assembled to the base 21.

As clearly shown in FIGS. 4, 5, and 10, a large recess 54 is formed in the housing 22 between the first receiving recess 29 and the second receiving recess 30. When the impact screwdriver 1 is set on the charger 20, a large space is provided around the grip handle 4 due to the large recess 54. A proximity sensor 55 is disposed in the bottom surface of the recess 54 for detecting an object entering the space between the sensor and the grip handle 4 and transmitting a signal indicating detection of an object to the charger circuit of the controller substrate 23. Upon receiving the detection signal, the charger circuit interrupts power supply to the impact screwdriver 1.

As shown in FIGS. 5 and 6, two lower partitions 57 are erected from the base 21, whereas two coplanar upper partitions 58 extend downward from the housing 22 to come into contact with the respective lower partitions 57. The upper and lower partitions 57 and 58 together separate the first receiving recess 29 from the inside of the housing 22 when the charger 20 is assembled. The cooling fan 25 operates by manipulation of a power switch 28 provided on the upper surface of the housing 22 over the transformer 24. When turned on, the cooling fan 25 draws in air through a plurality of slits 56 formed in a side wall of the housing 22 and sends a portion of the air into the first receiving recess 29. A portion of the drawn air is sent inside the housing 22 along the partitions 57 and 58 in two flows, one traveling under the large recess 54 and the other going around the recess 54. Both flows reach and converge at the location within the housing 22 below the second receiving recess 30. The converged flows of cooling air go through the through-hole 42 in the terminal board 40 and eventually exit the housing 22 at the four through-holes 51 in the guide plate 41. As shown in FIG. 5, a V-shaped current plate 59 protrudes from the guard strip 35 in the direction of the cooling fan 25 for channeling airflow into the first receiving recess 29.

As shown in FIGS. 5 to 7, two hexagonal nuts 61 are fastened to the base 21 and are pressed upon by pressure bosses 60 protruding downward from the inner surface of the housing 22 when the housing 22 is assembled. With particular reference to FIG. 7, fixing the charger 20 to, for example, a bench 62 by tightening bolts 63 to the hexagonal nuts 61 prevents shifting of the charger 20 on the bench even when the impact screwdriver 1 is repeatedly set on the charger.

The charger circuit realized on the controller substrate 23 charges the battery unit 5 of the impact screwdriver 1. Additionally, the charger circuit receives data on the charge level of the battery unit 5 and data on the temperature of the battery unit 5 from the respective terminals. Based on the fact that the temperature of the batteries sharply rises when they are almost completely charged, this allows the charger 20 to determine when the battery unit 5 is fully charged and to stop charging upon this detection. Moreover, if the impact screwdriver 1 is set on the charger 20 with its battery unit 5 charged to, for example, more than 80% of the capacity, in order to prevent heat build-up the charger 20 does not charge the battery unit. In order to indicate to the operator the charge level of the battery unit 5, the charger 20 has an additional function of lighting up a selected number of LDE lamps 65 (see FIG. 9) provided on the controller substrate 23 in accordance with the charge level. In this embodiment, an acrylic pin 64 protruding inward from the housing 22 abuts the tip of each LDE lamp 65 at an angle, allowing the operator to confirm the on/off status of the LDE lamps.

Referring to FIG. 10, in order to charge the battery unit 5 of the impact screwdriver 1, power is turned on by pressing the power switch 28. The impact screwdriver 1 is then set on the charger 20 by inserting the nose 3a into the first receiving recess 29 and the protrusion 7 into the second receiving recess 30 with grip handle 4 laid horizontally. This rests the nose 3a against the rubber cushion 34 on the resting plate 33 in the opening 31 while the circular recess 9 in the protrusion 7 fits over and rests on the circular protrusion 50 of the guide plate 41. Even if the operator fails to precisely position the nose 3a or the protrusion 7, the guide slope 32 and the guide slopes 37 insure that the nose 3a and the protrusion 7 are guided to the resting plate 33 and the guide plate 41. Since the cross ridges 52 provide two different levels on the surface of the guide plate 41, foreign matter entering the second receiving recess 30 tends to fall in to the lower level of the guide plate 41 between the ridges 52 so as to ensure proper positioning of the protrusion 7 and thus establish secure electrical contact between the terminals of the impact screwdriver 1 and the charger 20.

The rubber cushion 34 on the resting plate 33 provides elastic support for the nose 3a in the first receiving recess 29 whereas the guide plate 41 is elastically supported between the rubber rings 48 and the rubber pins 53 in the second receiving recess 30. In this arrangement, the impact of setting the screwdriver 1 is thus absorbed.

Still referring to FIG. 10, as soon as the impact screwdriver 1 is set on the charger 20, the terminals 10 of the impact screwdriver 1 abut and press down the contact 46a of the respective terminals 43 protruding above the guide plate 41. As indicated by the two-dot chain lines, this results in the terminals 43 slightly bent downward, thereby establishing electrical contact between the terminals 10 and the respective terminals 43 and initiation of charge of the batteries. Simultaneously, as the circular recess 9 fits snuggly over the circular protrusion 50 and the weight of the screwdriver 1 rests on the recess 9, the contact between the terminals are further stabilized. Foreign matter caught between the recess 9 and the protrusion 50 may affect alignment somewhat of the recess 9 with the circular protrusion 50, thus tilting the recess 9. However, the resiliency of the terminals 43 individually mounted on the terminal board 40 allows the terminals 43 to bend differently in response to such tilting, still maintaining electrical contact between the terminals.

As soon as the power switch 28 is switched on, the cooling fan 25 is turned on to generate airflow as described above. As the hydraulic unit 3 of the impact screwdriver 1 is positioned immediately downwind of the cooling fan 25, the airflow cools the hydraulic unit 3 during the charge. Simultaneously, as airflow through the inside of the housing 22 exits the charger 20 through the four through-holes 51, the terminals 10 and 43 are cooled so as to check the increase in contact resistance caused by the heat build-up during charge. The air flowing about the large recess 54 and reaching the guide plate 41 cools the controller substrate 23 and the transformer 24 as it flows.

When the battery unit 5 is charged to its full capacity, the LDE lamps 65 light up, indicating through the acrylic pins 64 the completion of the operation. The operator, confirming the completion of charging, can grip the handle 4 and lift the impact screwdriver 1 for use. Since a large, unobstructed space is provided around the grip handle 4, the operator can easily and quickly remove the screwdriver 1 from the charger 20 without interference from the housing 22. The operator's hand entering the large recess 54 is immediately detected by the proximity sensor 55, and the charger circuit interrupts the charge to the battery unit 5. This prevents the terminals 10 from being disconnected from the terminals 43 while they are passing current. This in turn prevents electrical arcing across the terminals, thereby ensuring a prolonged service life of the terminals 10 and 43.

As can been seen from the foregoing description, according to the battery-charging system of the invention, the impact screwdriver 1 is automatically charged simply by being set on the charger 20. In addition, the large recess 54 allows the operator to easily remove the screwdriver 1 from the charger 20. Therefore, the invention greatly simplifies the trouble involved in recharging impact screwdrivers or any other electric power tools to which the invention is applied, thereby enhancing work efficiency. This aspect of the invention is particularly useful when such tools are continuously used for a long time on assembly lines of, for example, automobile plants. If the charger 20 is located close to the operator, the operator can set the impact screwdriver 1 on the charger 20 whenever not in use to maintain the battery charge. Even if the charger 20 is not located close to the operator, one impact screwdrivers 1 can be in use while the other is set in the charger 20, allowing the operator to switch tools when the batteries are discharged. In this way, work efficiency or productivity is not affected as work can be continued with a minimum loss of time.

Unlike conventional battery packs, the internal battery unit 5 need not be removed from the impact screwdriver 1 to be recharged, nor does the battery unit 5 have to be reinstalled in the screwdriver 1 after being recharged. This significantly simplifies the recharging operation and handling of the screw driver 1. Due to the ease with which the battery unit 5 is charged, it can be charged very frequently. Since the impact screwdriver 1 can be frequently recharged with little trouble, the weight and size of the battery unit 5 can be reduced, thereby making the impact screwdriver 1 lighter and smaller than other impact screwdrivers that use detachable battery packs. This feature also reduces the physical strain on the operator and increases the operability and the work efficiency of the impact screwdriver 1.

According to the embodiment, the impact screwdriver 1 can be easily and quickly set on and removed from the charger 20. In particular, the guide slope 32 of the first receiving recess 29 and the guide slopes 37 of the second receiving recess 30 ensure that the impact screwdriver 1 is securely set in the right position on the charger 20, whereas the large recess 54 ensures that the impact screwdriver 1 is easily removed from the charger 20.

The rubber cushion 34 is provided in the first receiving recess 29, whereas the guide plate 41 is elastically supported by the rubber rings 48 and the rubber pins 53 in the second receiving recess 30. This arrangement dampens the shock of the impact screwdriver 1 to the charger 20 as well as the shock of the charger 20 to the impact screwdriver 1 when the screwdriver is set on the charger, thus protecting the entire system from such shocks and impacts.

As described above, the four terminals 43 of the charger 20 are individually mounted on the terminal board 40 with its vertical portions 46 elastically projecting above the guide plate 41. Even if the impact screwdriver 1 is slightly tilted in the second receiving recess 30, the terminals 43, due to their resiliency, bend unevenly to accommodate such tilting so as to establish electrical contact between the terminals of the charger 20 and the screwdriver 1.

Moreover, since each terminal 43 is caulked to the single terminal board 40, which is held down by the rubber ring 48, and is coupled to a lead wire by means of the receptacle 47, any of the terminals 43 can be easily replaced.

The built-in fan 25 prevents malfunctions and failures due to heat build-up in the battery-charging system by cooling the impact screwdriver 1 when set on the charger 20, the terminals 10 and 43, the transformer 24, and the controller substrate 23 of the charger 20

Those with ordinary skill in the art will appreciate that the present invention is applicable to electric power tools and appliances other than impact screwdrivers by adapting the configuration of the charger to suit particular applications.

According to the embodiment, the impact screwdriver 1 is set on the charger 20 with the grip handle 4 laid horizontally and the nose 3a oriented downwards (see FIG. 10), so that the terminals 43 provided on the bottom surface of the second receiving recess 30 are brought into electrical contact with the terminals 10 of the charger 20. This position is preferred because it facilitates setting and removal of the screwdriver 1 and also because the weight of the screwdriver 1 contributes to secure electrical contact between the terminals of the tool 1 and those of the charger 20. However, similar results can be obtained, for example, by changing the configuration of the battery-charging system so that the screwdriver 1 is inclined when set on the charger 20.

It is within the scope of the present invention to modify the charger 20 so as to receive and charge different types of electric power tools in one receiving recess. It is also within the scope of the present invention to provide the charger 20 with a plurality of receiving recesses where charging is performed in order to charge a plurality of electric power tools simultaneously. Moreover, the charger 20 can be divided into two units, one of which includes the power source and the charger circuit and the other which includes at least one pair of the first receiving recess 29 and the second receiving recess 30.

Other possible modification includes replacing the rubber cushion 34 in the first receiving recess 29 with a plurality of smaller rubber cushions and providing a separate resting plate elastically supported by rubber, coil springs, or leaf springs, instead of the resting plate 33, which is integrally formed with the base 21. In the second receiving recess 30, the shapes and numbers of the rubber rings 48 or the rubber pins 53, or both rubber rings 48 and rubber pins 53, can be changed to suit particular applications. The rubber rings 48 may also be replaced with coil or leaf springs or any other suitable elastic bodies. Additionally, the surfaces or the entirety of the guide plate 41 can be made of rubber to omit the rubber rings 48.

As for the structures of the terminals 43, these terminals do not have to be L-shaped as in the embodiment; any configuration may be sufficient as long as the terminals exhibit elasticity in the direction in which the impact screwdriver 1 is set on the charger 20. If no data transmission is carried out between the charger 20 and the impact screwdriver 1, the charger 20 requires only two terminals (positive and negative electrodes) for charging 20. Instead of utilizing the biasing force of the elastic terminals 43 to establish and maintain electrical contact between the terminals 10 and 43 as in the foregoing embodiment, other means and methods of establishing contact are possible. For example, the batteries of the impact screwdriver 1 may be charged by plugging the screwdriver into the charger 20. As a further modification, to order to protect the terminals while the impact screwdriver 1 is in use, each set of the terminals may be covered with a cap that can be opened and closed or a similar element while the screwdriver 1 is not set on the charger 20.

As for the function of the cooling fan 25, depending on the type of the electric power tool being charged and the manner in which the tool is set on the charger, no cooling air need be blown in the first receiving recess 29. In addition, the portion of air flowing about the large recess 54 may become heated after cooling the transformer 24 and other devices before reaching the second receiving recess 30, thus preventing sufficient reduction of the temperature of the terminals 43. To prevent this from occurring, the inside of the charger 20 may be divided by a partition into two compartments, with one containing the second receiving recess 30 and the other containing the transformer 24 and the controller substrate 23, thus allowing the portion of airflow cooling the transformer 24 to exit through a separate air outlet. Moreover, in the foregoing embodiment, the fan 25 is turned on by activating the power switch 28. Instead, the activation mechanism may be altered such that the fan 25 is activated as the proximity sensor 55 detects that the impact screwdriver 1 has been set in position for recharging.

As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

What is claimed is:

1. A power tool charging system, comprising:
   an electric power tool including
   at least one rechargeable battery,
   a handle containing the at least one battery,
   a plurality of first terminals provided on the handle for passing currents for charging the at least one battery,
   a nose to which a tool bit is attached, and
   a motor powered by the at least one battery for driving the nose; and
   a charger on which the electric power tool is set for charging the at least one battery, the charger including
   first means for receiving the handle of the electric power tool,
   second means for receiving the nose of the electric power tool, and
   a first recess disposed between the first and second receiving means, the first recess configured to provide clearance around the handle when the electric power tool is set on the charger,
   a plurality of second terminals that are connected to a charger circuit and are provided in the first receiving means, the second terminals establishing electrical contact with the first terminals when the electric power tool is set on the charger, whereby the charger is capable of charging at least one battery of the electric power tool when the handle and the nose are placed in the first and second receiving means, respectively.

2. A charging system in accordance with claim 1 further including first elastic means and second elastic means in the first receiving means and the second receiving means, respectively, for being elastically deformed approximately in the direction in which the electric power tool is set on the charger.

3. A charging system in accordance with claim 2, wherein the first and second elastic means are made of rubber adapted to cushion the impact of the handle and the nose on the first and second receiving means, respectively, when the handle and the nose are placed in the first and second receiving means.

4. A charging system in accordance with claim 3, wherein the second receiving means defines a second recess rimmed with at least one slope for guiding the nose into the second recess, the second recess having a bottom surface covered with the first elastic means.

5. A charging system in accordance with claim 4, further comprising a fan disposed in the charger for activation while the at least one battery is charged by the charger, said fan drawing air from the outside of the charger and discharging the air at the second terminals in the second means for receiving.

6. A charging system in accordance with claim 3, wherein the first terminals are provided on a protrusion that extends from the handle approximately parallel to the nose and further wherein the first receiving means defines a third recess rimmed with at least one slope for guiding the protrusion on the handle into the third recess, the third recess having a bottom surface on which the second elastic means is provided and from which the second terminals project.

7. A charging system in accordance with claim 6, wherein the third recess has a shape complementary to the protrusion so that the protrusion fits in the third recess.

8. A charging system in accordance with claim 3, wherein the handle is sized to form a clearance around the handle at least large enough to allow an operator's hand to grip the handle without contacting the charger.

9. A charging system in accordance with claim 3, wherein the second terminals are individually detachably mounted on a surface of the first receiving means and project from the surface so as to individually and elastically deform approximately in the direction in which the electric power tool is set on the charger, and further wherein the first terminals are configured to be pressed into contact with the second terminals when the electric power tool is set on the charger.

10. A charging system in accordance with claim 3, further comprising a fan disposed in the charger for activation while the at least one battery is charged by the charger, said fan drawing air from the outside of the charger and discharging the air at the second terminals in the second means for receiving.

11. A charging system in accordance with claim 2, wherein the handle is sized to form a clearance around the handle at least large enough to allow an operator's hand to grip the handle without contacting the charger.

12. A charging system in accordance with claim 2, wherein the second terminals are individually detachably mounted on a surface of the first receiving means and project from the surface so as to individually and elastically deform approximately in the direction in which the electric power tool is set on the charger, and further wherein the first terminals are configured to be pressed into contact with the second terminals when the electric power tool is set on the charger.

13. A charging system in accordance with claim 2, further comprising a fan disposed in the charger for activation while the at least one battery is charged by the charger, said fan drawing air from the outside of the charger and discharging the air at the second terminals in the second means for receiving.

14. A charging system in accordance with claim 1, wherein the handle is sized to form a clearance around the handle at least large enough to allow an operator's hand to grip the handle without contacting the charger.

15. A charging system in accordance with claim 1, wherein the second terminals are individually detachably mounted on a surface of the first receiving means and project from the surface so as to individually and elastically deform approximately in the direction in which the electric power tool is set on the charger, and further wherein the first terminals are configured to be pressed into contact with the second terminals when the electric power tool is set on the charger.

16. A charging system in accordance with claim 15, further comprising a fan disposed in the charger for activation while the at least one battery is charged by the charger, said fan drawing air from the outside of the charger and discharging the air at the second terminals in the second means for receiving.

17. A charging system in accordance with claim 1, further comprising a fan disposed in the charger for activation while the at least one battery is charged by the charger, said fan drawing air from the outside of the charger and discharging the air at the second terminals in the second means for receiving.

* * * * *